UNITED STATES PATENT OFFICE.

JOHN BLUM, OF BONIFACE, BRUSSELS, BELGIUM, ASSIGNOR OF ONE-HALF TO ALFRED WILLIAM CARPENTER, OF LONDON, ENGLAND.

MANUFACTURE OF ARTIFICIAL PARÁ RUBBER.

No. 904,470.   Specification of Letters Patent.   Patented Nov. 17, 1908.

Application filed October 5, 1908. Serial No. 456,325.

*To all whom it may concern:*

Be it known that I, JOHN BLUM, a subject of the King of Great Britain, residing at 7 Rue St. Boniface, Brussels, in the Kingdom of Belgium, have invented certain new and useful Improvements in and Relating to the Manufacture of Artificial Pará Rubber, of which the following is a specification.

This invention relates to the manufacture of artificial or synthetic Pará-rubber, that is to say a material having physical and chemical properties similar to those of Pará-rubber.

The process of manufacture is characterized by the fact that peat or similar vegetable matter, mixed with water is subjected to fermentation until a mucilaginous mass is formed consisting mainly of isoprene, and that to this mass there is added a nitrogenous derivative of irone, and small quantities of a mineral salt.

For the purpose of carrying the said invention into practice, the peat or similar vegetable matter is freed as far as possible from earthy substance with which it may be contaminated, and is then dried. Hot water at about 80° centigrade is then added to it and a small quantity of a ferment producing substance. The fermentation process is continued at a constant temperature of about 60° C. for some considerable time (say about three weeks); carbonic acid is liberated and after a few days mucilaginous filaments are produced, their quantity gradually increasing until, after complete fermentation, they amount to about 5% of the quantity of peat used. These mucilaginous filaments consist of hydrocarbons, particularly turpenes or analogous substances such as isoprene, and they are extracted with carbon disulfid or some other suitable solvent and subsequently separated therefrom in any appropriate manner.

The material so obtained is then treated with the nitrogenous derivative of irone (which may be produced in the manner hereinafter described) and with the mineral salts and is thereby converted into a substance having properties similar to those of Pará-rubber.

In order to obtain the nitrogenous irone derivative above referred to, the root-stock of plants of the *Iris* family, is suitably treated, as by disintegration and repeated lixiviation with hot water, for the purpose of dissolving the irone ($C_{13}H_{20}O$) which it contains. Chlorin in an appropriate form, for example in the form of gas, is then introduced into the "irone" solution, thereby forming irone hydro-chlorid. A suitable nitrogen compound, preferably an amin is then added, and the liquid is cooled to a low temperature. Crystals are formed, the chemical constitution of which may be represented approximately by the formula, $$C_{13}H_{18}NO$$

or $$C_{13}H_{17}(HNO);$$

and settle at the bottom of the liquid in the form of a brown powder and are removed by filtration.

The addition of the mineral salt is preferably made in the form of a mixture of carbonates in the proportion of four molecules of sodium bicarbonate to one molecule of calcium carbonate, about 2% of the mass being used.

The percentage of the nitrogenous irone derivatives in the final preparation amounts to about 1.8%.

The substance obtained in accordance with this process presents a strong resemblance to natural Pará rubber both in its chemical behavior and physical properties.

What I claim and desire to secure by Letters Patent of the United States is:

1. A process of manufacturing synthetic Pará rubber, which consists in subjecting vegetable matter, such as peat, to fermentation until a mucilaginous mass containing a large percentage of isoprene is formed, separating the mucilaginous mass from the remaining liquid, and treating it with a nitrogenous derivative of irone and suitable mineral salts.

2. A process for manufacturing synthetic Pará-rubber, which consists in mixing vegetable matter, such as peat, with water, subjecting it to fermentation, until a mucilaginous mass containing a large percentage of isoprene is formed, separating the mucilaginous mass from the remaining liquid, and treating it with a nitrogenous derivative of irone represented approximately by the formula $$C_{13}H_{17}(HNO)$$

and also with a small quantity of mineral salts.

3. A process for manufacturing synthetic Pará-rubber, which consists in mixing vegetable matter, such as peat, with water, subjecting it to fermentation, until a mucilaginous mass containing a large percentage of isoprene is formed, dissolving the mucilaginous isoprene-containing mass in a solvent such as carbon disulfid, separating the said isoprene-containing mass and solvent from the remaining liquid, and then separating the said mass from the solvent; dissolving out and separating the irone contained in the root-stock of *Iris* plants, converting the irone into irone hydrochlorid, treating it with a nitrogen compound, cooling the resultant liquid sufficient to crystallize out the nitrogenous irone derivative, and separating the crystals from the remaining liquid; and finally treating the said isoprene-containing mass with the said nitrogenous irone derivative, and with mineral salts.

In testimony whereof I affix my signature in presence of two witnesses.

JOHN BLUM.

Witnesses:
 HAROLD W. LAKE,
 FRANK L. BALL.